(12) United States Patent
Xu et al.

(10) Patent No.: US 12,374,046 B2
(45) Date of Patent: Jul. 29, 2025

(54) DEVICE AND METHOD FOR ESTIMATING THE SHAPE AND POSE OF A BODY

(71) Applicant: Shopee IP Singapore Private Limited, Singapore (SG)

(72) Inventors: Xiangyu Xu, Singapore (SG); Lijuan Liu, Singapore (SG); Shuicheng Yan, Singapore (SG)

(73) Assignee: Shopee IP Singapore Private Limited, Singapore (SG)

( * ) Notice: Subject to any disclaimer, the term of this patent is extended or adjusted under 35 U.S.C. 154(b) by 116 days.

(21) Appl. No.: 18/179,415

(22) Filed: Mar. 7, 2023

(65) Prior Publication Data

US 2023/0281926 A1 Sep. 7, 2023

(30) Foreign Application Priority Data

Mar. 7, 2022 (SG) ............................ 10202202251U (51) Int. Cl.
*G06T 17/20* (2006.01)
*G06N 3/04* (2023.01)
(Continued)

(52) U.S. Cl.
CPC ................ *G06T 17/20* (2013.01); *G06T 7/50* (2017.01); *G06T 7/70* (2017.01); *G06T 7/80* (2017.01);
(Continued)

(58) Field of Classification Search
CPC . G06T 7/194; G06T 5/50; G06T 11/60; G06T 2207/20084; G06T 2207/20081;
(Continued)

(56) References Cited

U.S. PATENT DOCUMENTS

| 11,887,248 B2 * | 1/2024 | Zakharov | ................ G06T 17/00 |
| 11,902,705 B2 * | 2/2024 | Shih | ........................ G06N 3/045 |

(Continued)

FOREIGN PATENT DOCUMENTS

| CN | 112232134 A | 1/2021 |
| CN | 112907736 A | 6/2021 |
| CN | 113936333 A | 1/2022 |

OTHER PUBLICATIONS

Stefania Cristina "The Transformer Attention Mechanism", Jan. 6, 2023, Making developers awesome at machine learning, pp. 1-3 (Year: 2023).*

(Continued)

*Primary Examiner* — Wesner Sajous
(74) *Attorney, Agent, or Firm* — Viering, Jentschura & Partner mbB (57) ABSTRACT

A method for estimating the shape and pose of a body includes obtaining an image of the body, extracting image features, and transforming the image features to a set of parameter values describing the body's shape and pose using a transformer comprising a cascade of transformer units, wherein each transformer unit operates on a representation of a respective version of the set of parameter values and modifies the representation of the respective version of the set of parameter values by the image features weighted by an attention of the respective version of the set of parameter values to the image features in sequence with a self-attention layer modifying the representation of the respective version of the set of parameter values by components of the representation of parameter values weighted by an attention between the components of the representation of the respective version of the set of parameter values to themselves.

19 Claims, 6 Drawing Sheets

(51) Int. Cl.
    *G06N 3/08*         (2023.01)
    *G06T 7/50*         (2017.01)
    *G06T 7/70*         (2017.01)
    *G06T 7/80*         (2017.01)

(52) U.S. Cl.
    CPC ............... *G06T 2207/20081* (2013.01); *G06T 2207/20084* (2013.01); *G06T 2207/30196* (2013.01)

(58) Field of Classification Search
    CPC . G06T 2207/20092; G06T 2207/20132; G06T 2207/20212; G06T 15/06; G06T 7/90; G06T 17/20; G06T 7/80; G06T 7/50; G06T 7/70; G06T 2207/30196; G06N 3/0895; G06N 3/0455; G06N 3/04; G06N 3/08
    See application file for complete search history.

(56) References Cited

U.S. PATENT DOCUMENTS

| | | | |
|---|---|---|---|
| 2021/0158107 A1 | 5/2021 | Karanam et al. | |
| 2022/0292654 A1* | 9/2022 | Zhang | G06T 7/194 |
| 2023/0267285 A1* | 8/2023 | Wu | G06F 40/166 |
| | | | 704/2 |

OTHER PUBLICATIONS

The Transformer Attention Mechanism (Year: 2023).*
Liu, Ze et al., "Swin Transformer: Hierarchical Vision Transformer using Shifted Windows", International Conference on Computer Vision (ICCV), 2021, pp. 10012-10022.
Luo, Zhengyi, "3D Human Motion Estimation via Motion Compression and Refinement", Asian Conference on Computer Vision (ACCV), Oct. 5, 2020, 21 pages.
Mehta, Dushyant et al., "Single-Shot Multi-Person 3D Pose Estimation From Monocular RGB", International Conference on 3D Vision (3DV 2018), 2018, 16 pages.
Xu, Xiangyu et al., "3D Human Shape and Pose from a Single Low-Resolution Image with Self-Supervised Learning", arXiv, Aug. 9, 2020, 17 pages.
Moreno-Noguer, Francesc, "3D Human Pose Estimation from a Single Image via Distance Matrix Regression", IEEE Conference on Computer Vision and Pattern Recognition (CVPR), 2016, 10 pages.
Nah, Seungjun et al., "Deep multi-scale convolutional neural network for dynamic scene deblurring", IEEE Conference on Computer Vision and Pattern Recognition (CVPR), 2018, 21 pages.
Omran, Mohamed et al., "Neural Body Fitting: Unifying Deep Learning and Model-Based Human Pose and Shape Estimation", International Conference on 3D Vision (3DV 2018), 2018, 13 pages.
Pavlakos, Georgios et al., "Learning to Estimate 3D Human Pose and Shape from a Single Color Image", IEEE Conference on Computer Vision and Pattern Recognition (CVPR), 2018, 10 pages.
Romero, Javier et al., "Embodied Hands: Modeling and Capturing Hands and Bodies Together", ACM Transactions on Graphics vol. 36, No. 6, Nov. 2017, 19 pages.
Schönemann, Peter H., "A Generalized Solution of the Orthogonal Procrustes Problem", Psychometrika vol. 31, No. 1, Mar. 1966, pp. 1-10.
Moon, Gyeongsik et al., "Pose2Pose: 3D Positional Pose-Guided 3D Rotational Pose Prediction for Expressive 3D Human Pose and Mesh Estimation", arXiv, Apr. 1, 2021, 15 pages.
Sengupta, Akash et al., "Probabilistic 3D Human Shape and Pose Estimation from Multiple Unconstrained Images in the Wild", IEEE Conference on Computer Vision and Pattern Recognition (CVPR), 2021, 10 pages.
Song, Jie et al., "Human Body Model Fitting by Learned Gradient Descent", European Conference on Computer Vision (ECCV), 2020, 17 pages.
Sun, Deqing et al., "PWC-Net: CNNs for Optical Flow Using Pyramid, Warping, and Cost Volume", IEEE Conference on Computer Vision and Pattern Recognition (CVPR), 2017, 18 pages.
Sun, Yu et al., "Monocular, One-stage, Regression of Multiple 3D People", International Conference on Computer Vision (ICCV), 2021, 10 pages.
Sun, Yu et al., "Human Mesh Recovery from Monocular Images via a Skeleton-disentangled Representation", International Conference on Computer Vision (ICCV), 2019, 10 pages.
Tung, Hsiao-Yu Fish et al., "Self-supervised Learning of Motion Capture", 31st Conference on Neural Information Processing Systems (NeurIPS), 2017, 11 pages.
Wan, Ziniu et al., "Encoder-decoder with Multi-level Attention for 3D Human Shape and Pose Estimation", International Conference on Computer Vision (ICCV), 2021, 10 pages.
Xu, Yuanlu et al., "DenseRaC: Joint 3D Pose and Shape Estimation by Dense Render-and-Compare", International Conference on Computer Vision (ICCV), 2019, 11 pages.
Zanfir, Andrei et al., "Weakly Supervised 3D Human Pose and Shape Reconstruction with Normalizing Flows", European Conference on Computer Vision (ECCV), 2020, 20 pages.
Zanfir, Andrei et al., "Neural Descent for Visual 3D Human Pose and Shape", IEEE Conference on Computer Vision and Pattern Recognition (CVPR), 2021, 10 pages.
Zanfir, Mihai et al., "THUNDR: Transformer-based 3D HUmaN Reconstruction with Markers", International Conference on Computer Vision (ICCV), 2021, 11 pages.
Zeng, Wang et al., "3D Human Mesh Regression with Dense Correspondence", IEEE Conference on Computer Vision and Pattern Recognition (CVPR), 2021, 15 pages.
Zhang, Han et al., "Self-Attention Generative Adversarial Networks", International Conference on Machine Learning (ICML), 2018, 10 pages.
Zhang, Hongwen et al., "Learning 3D Human Shape and Pose from Dense Body Parts", IEEE Transactions on Pattern Analysis and Machine Intelligence (TPAMI), 2020, 18 pages.
Zhang, Hongwen et al., "PyMAF: 3D Human Pose and Shape Regression with Pyramidal Mesh Alignment Feedback Loop", International Conference on Computer Vision (ICCV), 2021, 17 pages.
Zhang, Tianshu et al., "Object-Occluded Human Shape and Pose Estimation from a Single Color Image", IEEE Conference on Computer Vision and Pattern Recognition (CVPR), 2020, pp. 7376-7385.
Anonymous ECCV Submission, "Taming Transformers for Monocular 3D Human Shape and Pose Estimation", European Conference on Computer Vision (ECCV), 2022, Paper ID 1410, 18 pages.
Bogo, Federica et al., "Keep it SMPL: Automatic Estimation of 3D Human Pose and Shape from a Single Image", European Conference on Computer Vision (ECCV), 2016, 18 pages.
Choi, Hongsuk et al., "Pose2Mesh: Graph Convolutional Network for 3D Human Pose and Mesh Recovery from a 2D Human Pose", European Conference on Computer Vision (ECCV), 2021, 27 pages.
Dai, Jian S., "Euler-Rodrigues formula variations, quaternion conjugation and intrinsic connections", Mechanism and Machine Theory, No. 92, 2015, pp. 144-152.
Devlin, Jacob et al., "BERT: Pre-training of Deep Bidirectional Transformers for Language Understanding", Annual Conference of the North American Chapter of the Association for Computational Linguistics (NAACL), 2019, 16 pages.
Dosovitskiy, Alexey et al., "An image is worth 16x16 words: Transformers for image recognition at scale", International Conference on Learning Representations (ICLR), 2021, 21 pages.
Hartley, Richard et al., "Multiple View Geometry in Computer Vision", 2nd Ed., Cambridge University Press, 2003.
Ionescu, Catalin et al., "Human3.6M: Large Scale Datasets and Predictive Methods for 3d Human Sensing in Natural Environments", IEEE Transactions on Pattern Analysis and Machine Intelligence (TPAMI), 2014, 15 pages.

(56) References Cited

OTHER PUBLICATIONS

Kanazawa, Angjoo et al., "End-to-end Recovery of Human Shape and Pose", IEEE Conference on Computer Vision and Pattern Recognition (CVPR), 2018, 10 pages.
Kocabas, Muhammed et al., "VIBE: Video Inference for Human Body Pose and Shape Estimation", IEEE Conference on Computer Vision and Pattern Recognition (CVPR), 2020, 12 pages.
Kolotouros, Nikos et al., "Learning to Reconstruct 3D Human Pose and Shape via Model-fitting in the Loop", International Conference on Computer Vision (ICCV), 2019, 10 pages.
Kolotouros, Nikos et al., "Convolutional Mesh Regression for Single-Image Human Shape Reconstruction", IEEE Conference on Computer Vision and Pattern Recognition (CVPR), 2019, 10 pages.
Kwon, Youngjoong et al., "Neural Human Performer: Learning Generalizable Radiance Fields for Human Performance Rendering", 35th Conference on Neural Information Processing Systems (NIPS), 2021, 15 pages.
Li, Ruilong et al., "AI Choreographer: Music Conditioned 3D Dance Generation with AIST++", International Conference on Computer Vision (ICCV), 2021, 15 pages.
Lin, Kevin et al., "End-to-End Human Pose and Mesh Reconstruction with Transformers", IEEE Conference on Computer Vision and Pattern Recognition (CVPR), 2021, 17 pages.
Lin, Kevin et al., "Mesh Graphormer", International Conference on Computer Vision (ICCV), 2021, 15 pages.
Loper, Matthew et al., "SMPL: A Skinned Multi-Person Linear Model", ACM Transactions on Graphics, vol. 34, No. 6, Article 248, Nov. 2015, 16 pages.
Von Marcard, Timo et al., "Recovering Accurate 3D Human Pose in The Wild Using IMUs and a Moving Camera", European Conference on Computer Vision (ECCV), 2018, 17 pages.
Moon, Gyeongsik et al., "I2L-MeshNet: Image-to-Lixel Prediction Network for Accurate 3D Human Pose and Mesh Estimation from a Single RGB Image", European Conference on Computer Vision (ECCV), 2020, 23 pages.
Peng, Sida et al., "Neural Body: Implicit Neural Representations with Structured Latent Codes for Novel View Synthesis of Dynamic Humans", IEEE Conference on Computer Vision and Pattern Recognition (CVPR), 2021, pp. 9054-9063.
Rajasegaran, Jathushan et al., "Tracking People with 3d Representations", 35th Conference on Neural Information Processing Systems (NIPS), 2021, 11 pages.
Sanyal, Soubhik et al., "Learning Realistic Human Reposing using Cyclic Self-Supervision with 3D Shape, Pose, and Appearance Consistency", International Conference on Computer Vision (ICCV), 2021, 11 pages.
Sun, Ke et al., "Deep High-Resolution Representation Learning for Human Pose Estimation", IEEE Conference on Computer Vision and Pattern Recognition (CVPR), 2019, pp. 5693-5703.
Vaswani, Ashish et al., "Attention Is All You Need", 31st Conference on Neural Information Processing Systems (NIPS), 2017, 11 pages.
Wang, Jian et al., "Re-Identification Supervised Texture Generation", IEEE Conference on Computer Vision and Pattern Recognition (CVPR), 2019, 11 pages.
Xu, Xiangyu et al., "3D Human Pose, Shape and Texture from Low-Resolution Images and Videos", IEEE Transactions on Pattern Analysis and Machine Intelligence (TPAMI), 2021, 15 pages.
Xu, Xiangyu et al., "3D Human Texture Estimation from a Single Image with Transformers", International Conference on Computer Vision (ICCV), 2021, pp. 13849-13858.
Carnegie Mellon University; "CMU graphics lab motion capture database"; 2010; retrieved on http://mocap.cs.cmu.edu/.
Akhter, Ijaz et al., "Pose-Conditioned Joint Angle Limits for 3D Human Pose Reconstruction", IEEE Conference on Computer Vision and Pattern Recognition (CVPR), 2015, 10 pages.
Andriluka, Mykhaylo et al., "2D Human Pose Estimation: New Benchmark and State of the Art Analysis", IEEE Conference on Computer Vision and Pattern Recognition (CVPR), 2014, 8 pages.
Arnab, Anurag et al., "Exploiting temporal context for 3D human pose estimation in the wild", IEEE Conference on Computer Vision and Pattern Recognition (CVPR), 2019, 13 pages.
Chen, Hanting et al., "Pre-Trained Image Processing Transformer", IEEE Conference on Computer Vision and Pattern Recognition (CVPR), 2021, 15 pages.
Carion, Nicolas et al., "End-to-End Object Detection with Transformers", European Conference on Computer Vision (ECCV), 2020, 17 pages.
Choi, Hongsuk et al., "Beyond Static Features for Temporally Consistent 3D Human Pose and Shape from a Video", IEEE Conference on Computer Vision and Pattern Recognition (CVPR), 2021, 12 pages.
Doersch, Carl et al., "Sim2real transfer learning for 3d human pose estimation: motion to the rescue", 33rd Conference on Neural Information Processing Systems (NIPS), 2019, 14 pages.
Dwivedi, Sai Kumar et al., "Learning to Regress Bodies from Images using Differentiable Semantic Rendering", International Conference on Computer Vision (ICCV), 2022, 15 pages.
Georgakis, Georgios et al., "Hierarchical Kinematic Human Mesh Recovery", European Conference on Computer Vision (ECCV), 2020, 17 pages.
Güler, Riza Alp et al., "HoloPose: Holistic 3D Human Reconstruction In-The-Wild", IEEE Conference on Computer Vision and Pattern Recognition (CVPR), 2019, pp. 10884-10894.
Jiang, Wen et al., "Coherent Reconstruction of Multiple Humans from a Single Image", IEEE Conference on Computer Vision and Pattern Recognition (CVPR), 2020, pp. 82-91.
Jiang, Yifan et al., "TransGAN: Two Pure Transformers Can Make One Strong GAN, and That Can Scale Up", 35th Conference on Neural Information Processing Systems (NIPS), 2021, 19 pages.
Joo, Hanbyul et al., "Exemplar Fine-Tuning for 3D Human Model Fitting Towards In-the-Wild 3D Human Pose Estimation", Facebook AI Research, Oct. 22, 2021, 21 pages.
Kanazawa, Angjoo et al., "Learning 3D Human Dynamics from Video", IEEE Conference on Computer Vision and Pattern Recognition (CVPR), 2019, pp. 5614-5623.
Kingma, Diederik P. et al., "ADAM: A method for stochastic optimization", International Conference on Learning Representations (ICLR), 2017, 15 pages.
Kocabas, Muhammed et al., "PARE: Part Attention Regressor for 3D Human Body Estimation", International Conference on Computer Vision (ICCV), 2021, pp. 11127-11137.
Kocabas, Muhammed et al., "SPEC: Seeing People in the Wild with an Estimated Camera", International Conference on Computer Vision (ICCV), 2021, pp. 11035-11045.
Kolotouros, Nikos et al., "Probabilistic Modeling for Human Mesh Recovery", International Conference on Computer Vision (ICCV), 2021, 6 pages.
Lassner, Christoph et al., "Unite the People: Closing the Loop Between 3D and 2D Human Representations", IEEE Conference on Computer Vision and Pattern Recognition (CVPR), 2021, pp. 6050-6059.
Lee, Gun-Hee et al., "Uncertainty-Aware Human Mesh Recovery from Video by Learning Part-Based 3D Dynamics", International Conference on Computer Vision (ICCV), 2021, pp. 12375-12384.
Li, Jiefeng et al., "HybrIK: A Hybrid Analytical-Neural Inverse Kinematics Solution for 3D Human Pose and Shape Estimation", IEEE Conference on Computer Vision and Pattern Recognition (CVPR), 2022, 14 pages.
Lin, Tsung-Yi et al., "Microsoft COCO: Common Objects in Context", European Conference on Computer Vision (ECCV), 2015, 15 pages.
Examination Report issued for the corresponding Singapore patent application No. 10202202251U, dated Apr. 24, 2022, 5 pages (for informational purposes only).
Search Report issued for the corresponding Singapore patent application No. 10202202251U, dated Apr. 24, 2022, 2 pages (for informational purposes only).

\* cited by examiner

DEVICE AND METHOD FOR ESTIMATING THE SHAPE AND POSE OF A BODY

CROSS-REFERENCE TO RELATED APPLICATIONS

This application claims priority to Singapore Patent Application 10202202251U, which was filed on Mar. 7, 2022, the entire content of which is incorporated by reference herein.

TECHNICAL FIELD

Various aspects of this disclosure relate to devices and methods for estimating the shape and pose of a body.

BACKGROUND

Monocular 3D human shape and pose estimation is a fundamental task in computer vision, which aims to recover the unclothed human body as well as its 3D pose from a single input image and can be used in many applications including visual tracking, virtual/augmented reality, motion generation, image manipulation, and neural radiance fields. Different from multi-view 3D reconstruction where the solution is well regularized by epipolar constraints, this task is in particular challenging due to the inherent depth ambiguity of a single 2D image, which usually requires strong knowledge and informative patterns learned from large amounts of data to generate reasonable results.

Accordingly, efficient methods for estimating the shape and pose of a body from a single image are desirable.

SUMMARY

Various embodiments concern a method for estimating the shape and pose of a body comprising obtaining an image of the body, extracting image features from the image, and transforming the image features to a set of parameter values describing the shape and pose of the body by means of a transformer comprising a cascade of transformer units, wherein each transformer unit operates on a representation of a respective version of the set of parameter values and comprises a cross-attention layer modifying the representation of the respective version of the set of parameter values by the image features weighted by an attention of the respective version of the set of parameter values to the image features in sequence with a self-attention layer modifying the representation of the respective version of the set of parameter values by components of the representation of the respective version of the set of parameter values weighted by an attention between the components of the representation of the respective version of the set of parameter values to themselves.

According to one embodiment, the self-attention layer comprises at least one self-attention unit performing respective attention operation with query, key and value, for which each of the query, the key and the value are set to, up to a modification by positional encoding (which is optional), the representation of the respective version of the set of parameter values.

According to one embodiment, the cross-attention layer comprises at least one cross-attention unit performing respective attention operation with query, key and value, for which the query is set to, up to a modification by positional encoding (which is optional), the representation of the respective version of the set of parameter values and the key and the value are set to, up to a modification by positional encoding, the image features or a subset of the image features.

According to one embodiment, the image features comprise image features for each of a plurality of scales and wherein the cross-attention layer comprises a cross-attention unit for each layer modifying the representation of the respective version of the set of parameter values by an attention from the representation to image features of the scale.

According to one embodiment, the cross-attention layer outputs a modified version of the representation of the set of parameter values which it generates by averaging results of the modifying performed by the cross-attention units for the scales.

According to one embodiment, the set of parameters comprises values of parameters of a parametric body model.

According to one embodiment, the method further comprises generating a mesh representation of the body from the values of the parameters of the parametric body model.

According to one embodiment, the set of parameter values comprises values for a set of parameters including rotation parameters for each of a plurality of parts of the body.

According to one embodiment, the cross-attention layer comprises a local attention unit modifying the representation of the respective version of the set of parameter values by, for each of the rotation parameters, the image features of a patch showing the body part weighted by an attention of the respective version of the set of parameter values to the image features of the patch showing the body part.

According to one embodiment, the cross-attention layer outputs a modified version of the representation of the set of parameter values which it generates by summing a result of the modifying performed by the local attention unit and a result of the modifying of the representation of the respective version of the set of parameter values by the image features weighted by an attention of the respective version of the set of parameter values to the image features.

According to one embodiment, the set of parameter values comprises values for a set of shape parameters.

According to one embodiment, the image is obtained by means of a camera and the set of parameter values comprises values for a set of camera parameters.

According to one embodiment, the method comprises extracting the image features by means of a convolutional neural network.

According to one embodiment, the method comprises training the transformer by supervised learning.

According to one embodiment, the transformer is trained using a ground truth for at least one of 2D vertices of a model of the body and joint configurations of the body.

According to one embodiment, the transformer is trained using a ground truth for rotation parameters for each of a plurality of parts of the body.

According to one embodiment, the cross-attention layer disregards attention of the representation of the respective version of the set of parameter values to itself and disregards attention of the respective version of the set of parameter values to the image features.

According to one embodiment, the self-attention layer disregards attention disregards attention of the respective version of the set of parameter values to the image features and disregards attention of the image features to the respective version of the set of parameter values.

According to one embodiment, the method comprises generating an initial version of the set of parameter values from the extracted image features and generating a sequence of successively updated versions of the set of parameter values by generating each updated version of the set of parameter values by updating a previous version of the set of parameter values in the sequence according to a result of modifying a representation of the previous version of the set of parameter values by one or more of the transformer units and mapping a result of the modifying of the representation of the previous version of the set of parameter values to a corresponding version of the set of parameter values (e.g. transforming a result of the modifying of the representation of the previous version of the set of parameter values to an update of the set of parameter values and adding the update to the previous version of the set of parameter values).

Modifying by multiple transformer units means (since they form a cascade) modifying the representation by one transformer unit, then modifying the result by the next etc.

According to one embodiment, the mapping comprises an operation by a linear layer (and, if the result of the linear layer is an update, an addition).

According to one embodiment, a data processing device configured to perform the method of any one of the embodiments described above is provided.

According to one embodiment, a computer program element is provided comprising program instructions, which, when executed by one or more processors, cause the one or more processors to perform the method according to any one of the embodiments described above.

According to one embodiment, a computer-readable medium is provided comprising program instructions, which, when executed by one or more processors, cause the one or more processors to perform the method according to any one of the embodiments described above.

It should be noted that embodiments described in context of the method for estimating the shape and pose of a body are analogously valid for the data processing device and vice versa.

BRIEF DESCRIPTION OF THE DRAWINGS

The invention will be better understood with reference to the detailed description when considered in conjunction with the non-limiting examples and the accompanying drawings, in which.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

Figure 1:
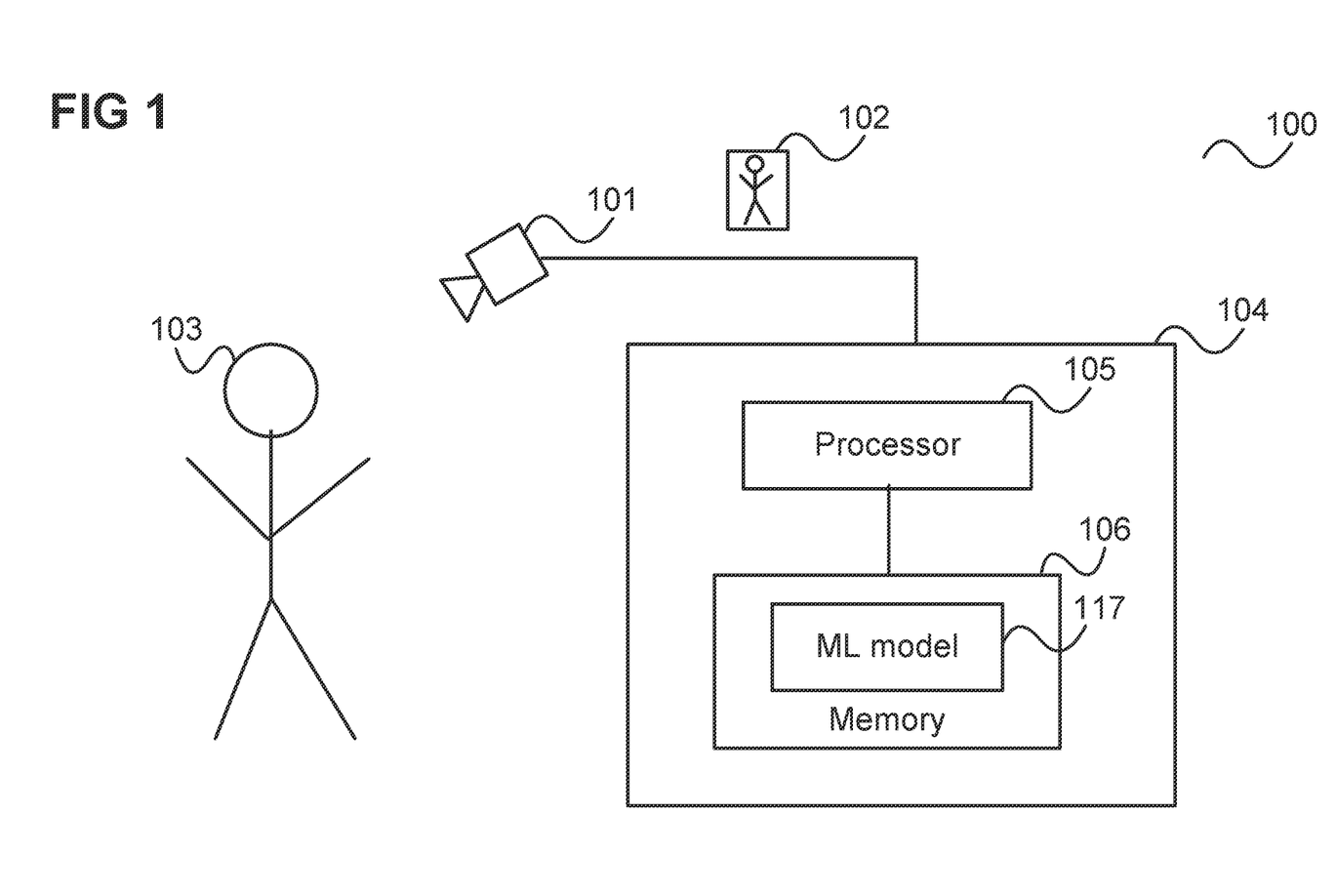
FIG. 1 shows a human shape and pose estimation arrangement according to an embodiment.

FIG. 1 shows a human shape and pose estimation arrangement 100 according to an embodiment.

A camera 101 takes an image 102 (e.g. an RGB image) of a human person 103. The image 102 is fed to a data processing device 104 (typically a computer). The data processing device 104 comprises a processor (e.g. CPU) 105, a system memory 106 and may comprise further data processing components like a hard-disk memory, various input/output (I/O) devices etc.

According to various embodiments, the data processing device 104 operates as a shape and pose estimator. For this, a machine learning model 117 is stored in the memory (in the form of a part of a computer program) and the processor 105 performs a shape and pose estimation method using the machine learning model 117.

According to various embodiments, the data processing device 104 performs monocular 3D shape and pose estimation (of a human, but other objects, in particular animals but also robots or other mechanical movable devices, are also possible), i.e. estimates the shape and pose of the human person 103 from a single 2D image 102. This is a difficult task due to the inherent depth ambiguity of a single 2D image.

For this task a transformer (deep learning model) may be used for the machine learning model 117. In particular, a transformer may be used to estimate a 3D human mesh as it has powerful capabilities in representation learning and pattern recognition. Such a transformer may follow a design of a ViT (Vision transformer) as it is illustrated by FIG. 2A.

Figure 2A:
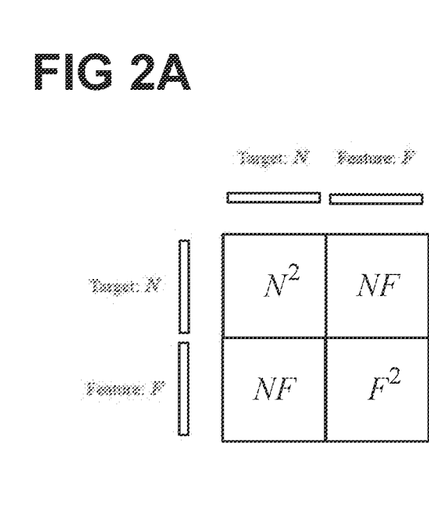
FIGS. 2A to 2C illustrate different transformer designs for shape and pose estimation.

FIG. 2A illustrates a transformer design where the target embeddings are first concatenated with the input features and then processed by a full attention layer that models all pairwise dependencies including target-target, target-feature, feature-target, and feature-feature by corresponding attention, i.e. attention of representation to itself (i.e. of components of the representation to themselves), attention of components of the representation to the image features, attention of the image features to the representation and attention of the image features to themselves, respectively.

While a transformer of this design can achieve impressive results for 3D human shape and pose estimation, it leads to quadratic computation and memory complexity with respect to the image feature length F, i.e., $O((N+F)^2)$ as illustrated in FIG. 2A where N is the length of the target embedding. Thus, a transformer with this design can typically only employ low-resolution image features where F is fairly small, i.e. this design prevents the transformer from using higher-resolution features for more accurate 3D human recovery.

In view of the above, according to various embodiments, a machine learning model 117 is used for shape and pose estimation which has a transformer architecture which allows better exploitation of high-resolution image features for high-quality 3D body shape and pose reconstruction. Specifically, the machine learning model 117 includes the following two design characteristics (which are, according to various embodiments, used in combination but which may also be used independently from each other).

First, different from the ViT style transformer where the image features are learned by attention operations, the machine learning model 117 uses a feature extractor like a convolutional neural network (CNN) to extract image features from the image 102 and it uses attention operations only to aggregate the features to improve the target embeddings. Thus, it is less important to model feature-feature and feature-target correlation (as in design of FIG. 2A). Accordingly, according to various embodiments, the full attention operation is decoupled into a target-feature attention and a target-target attention that are cascaded to avoid the quadratic complexity.

Figure 2B:
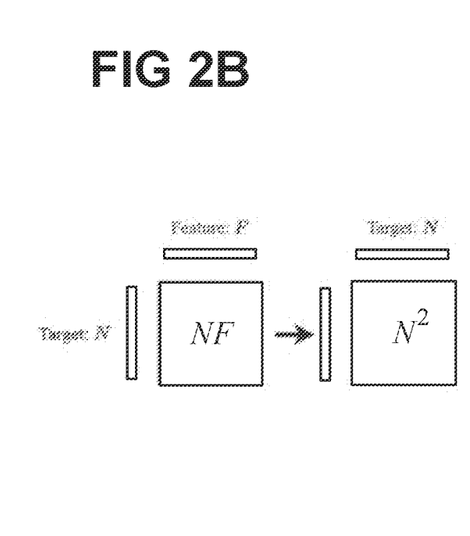

FIG. 2B illustrates a transformer design with a decoupled attention according to various embodiments which leads to a computation and memory complexity of $O((N+F)N)$ which is linear with respect to the feature length F.

Second, while the decoupling strategy effectively improves the efficiency of the transformer compared to the ViT style, straightforwardly using it for 3D human reconstruction still leads to a considerably heavy cost of computation and memory, if a vertex-based target (i.e. human body) representation for the transformer is used where the embedding length N is often quite large, equalling the number of vertices on a body mesh. To address this issue, according to various embodiments, a representation based on a parametric body model (e.g. SMPL (Skinned Multi-Person Linear Model) is used, where a target embedding only needs to be learned for a small number of body parts that account for 3D body part rotations, plus one query for human body shape. A parametric body model may in this context be understood as a model of a body which defines a shape and pose of the body by, in particular, rotations of body parts (e.g. limbs) with respect to each other.

FIG. 2B illustrates a transformer design with decoupled attention (according to FIG. 2B) and further using a SMPL representation which further lessens the computation and memory burden compared to the vertex representation with Q<<N.

So, in combination, the above two design characteristics lead to a more concise attention learning process (compared to ViT style design) and in particular allows the machine learning model 117 to use high-resolution (image) features (i.e. a larger F) for high-quality 3D human mesh reconstruction. This means that by improving the attention formulation and the target representation transformer architecture is provided that can exploit higher-resolution features for accurate monocular 3D human shape and pose estimation.

According to various embodiments, an omni-scale transformer is used which effectively aggregates multi-resolution features as well as local image information.

Figure 3:
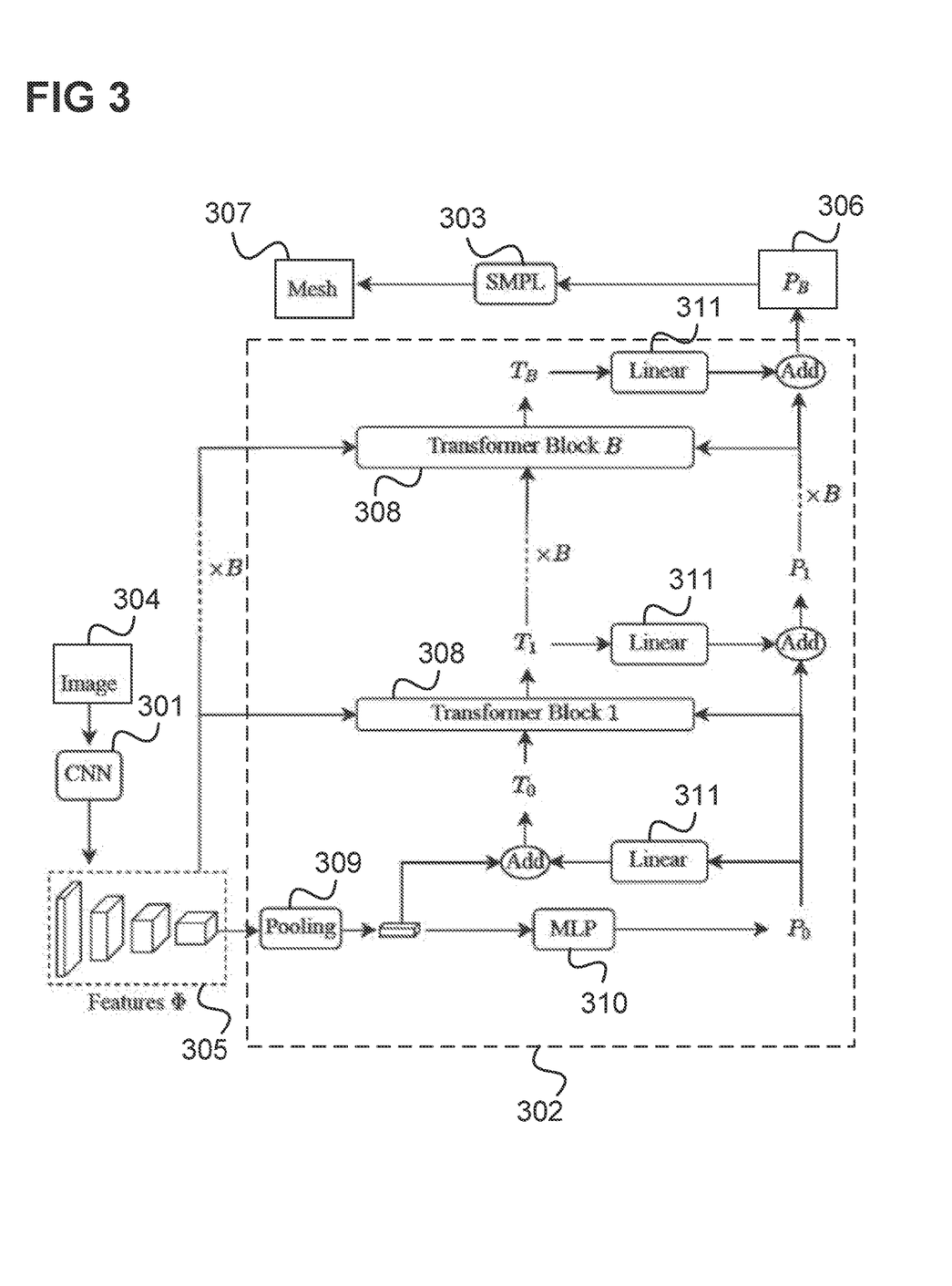
FIG. 3 illustrates a machine learning model according to an embodiment.

FIG. 3 illustrates the processing pipeline of a machine learning model according to an embodiment.

The machine learning model for example corresponds to the machine learning model 117. It comprises an image feature extractor 301 (e.g. a CNN) for extracting image features 305 (of length F) from an input image 304 (e.g. corresponding to image 106), a transformer 302 which receives the image features 304 as input and outputs a shape and pose parameter values 306 (including parameter values describing the shape and pose of the body 103) and an SMPL conversion 303 which generates a human body mesh 307 from the shape and pose parameter values 306 as the output of the shape and pose estimation.

SMPL is a flexible and expressive human body model for 3D human shape and pose modelling. It is parameterized by a compact shape vector $\beta \in \mathbb{R}^{10}$ and a set of rotation parameters $\{\theta_i \in \mathbb{R}3, i \in 1, 2, \ldots, J\}$.

The body shape is represented by a low-dimensional space learned with Principal Component Analysis from a training set of 3D human scans, where $\beta$ is the vector of coefficients of the principal basis vectors. The body pose is defined by a skeleton rig with J=24 joints including the body root, and $\theta_i$ is the rotation of the i-th body part in the axis-angle form whose skew symmetric matrix lies in the Lie algebra space $\mathfrak{so}(3)$.

From $\{\theta_1, \theta_2, \ldots, \theta_J\}$ and $\beta$ the data processing device 104 can calculate a 3D body mesh $$V = f_{SMPL}(\{\theta_1, \theta_2, \ldots, \theta_J\}, \beta) \qquad (1)$$

where $V \in \mathbb{R}_{N \times 3}$ is the vector of vertices of a triangulated surface with, according to one embodiment, N=6890 and where $f_{SMPL}$ is realized by the SMPL conversion 303.

From the body mesh, the data processing device 104 can estimate the 3D locations of the body joints X using a pre-trained linear mapping matrix $\mathcal{M} \in \mathbb{R}_{J \times N}$:

$$X \in \mathbb{R}^{J \times 3} = \mathcal{M} V \qquad (2)$$

With the 3D human joints, the data processing device 104 can further obtain the 2D joints using weak perspective projection. Denoting the camera parameters as $\mathcal{C} \in \mathbb{R}^3$ that include the scaling factor and the 2D principal-point translation in the projection process, the 2D keypoints can be formulated as:

$$\mathcal{J} \in \mathbb{R}^{J \times 2} = \Pi_\mathcal{C}(X) \qquad (3)$$

where $\Pi_\mathcal{C}$ is the projection function.

The transformer comprises a sequence (or, in other words, a cascade) of transformer blocks 308 which each perform multiple attention operations, i.e. has multiple attention heads. An attention operation can be seen as the central component of a transformer and can be formulated as:

$$\tilde{\mathcal{Q}} = \text{Softmax}\left(\frac{(\mathcal{Q} \cdot W_q)(\mathcal{K} \cdot W_k)^\top}{\sqrt{d}}\right)(\mathcal{V} \cdot W_v) \qquad (4)$$

where $\mathcal{Q} \in \mathbb{R}^{Q \times d}$ and $\mathcal{K}, \mathcal{V} \in \mathbb{R}_{K \times d}$ are the input of the attention operation, representing query, key, and value, respectively. $\tilde{\mathcal{Q}} \in \mathbb{R}^{Q \times d}$ is the output of the attention operation. $Q$ is the length of the query $\mathcal{Q}$ and K is the length of $\mathcal{K}$ and $\mathcal{V}$.

The key and value are generally the same, while $\mathcal{Q}$ and $\mathcal{K}$ could be the same or different (correspondingly, the attention given in equation (4) is called self-attention or cross-attention). d denotes the size of the channel dimension. $W_q, W_k, W_v \in \mathbb{R}^{d \times d}$ represent learnable linear projection weights. It should be noted that while single-head attention is illustrated here for clarity, multi-head attention may be used by applying different linear projection weights to different attention heads.

Essentially, equation (4) can be seen to model dependencies between element pairs from $\mathcal{Q}$ and $\mathcal{K}$ with dot product and obtains an enhanced query embedding (i.e. an updated embedding (also referred to as "representation") of the parameter set describing pose and shape) $\tilde{\mathcal{Q}}$ by aggregating information from $\mathcal{V}$, where the aggregation weights are decided according to the dependencies between $\mathcal{Q}$ and $\mathcal{K}$.

Figure 2C:
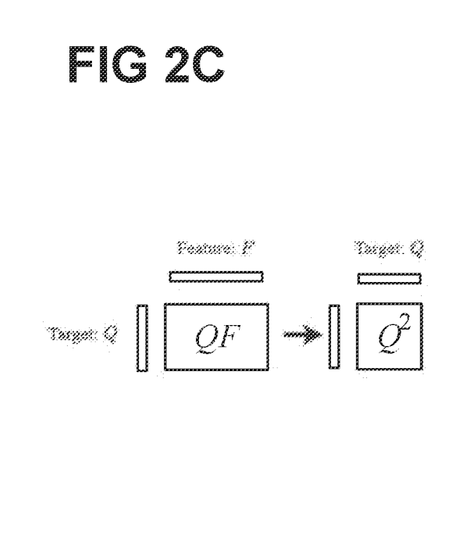

Recovering the 3D body mesh 307 by regressing the vertex locations V leads to a redundant target representation $[q_{v_1}, q_{v_2}, \ldots, q_{v_N}]$ where $q_{v_i} \in \mathbb{R}^d$ is the embedding of the i-th vertex $v_i$. The length of this target embedding is often quite large (N=6890 by default for the SMPL mesh), resulting in heavy computation and memory cost in attention operations even after mesh downsampling as illustrated in FIG. 2A. To address this issue, according to various embodiments, instead of a vertex-based target representation, the target representation of the transformer 302 is an SMPL-based representation and the transformer 306 thus estimates values of a (compared to the 3D mesh) smaller set of parameters $P = \{\theta_1, \theta_2, \ldots, \theta_J, \beta, \mathcal{C}\}$ that describe the 3D human shape and pose as well as the camera as the shape and pose parameter values 306. Specifically, the SMPL-based target embedding (also referred to as (target) representation (of the parameter value set, e.g. SMPL parameter set, describing the shape of pose of the body) can be written as $T = [q_{\theta_1}, q_{\theta_2}, \ldots, q_{\theta_J}, q_\beta, q_\mathcal{C}]$ which separately correspond to the variables in P. The length of this representation is much shorter than the vertex-based embedding, thereby facilitating the efficient design of the machine learning model (as illustrated in FIG. 2C. In addition, the target representation allows restricting the solution to lie in the SMPL body space, which naturally ensures smooth meshes, whereas the vertex representation lacks proper smoothing regularization and may lead to a spiky body surface.

The CNN 301 generates, from the input image 304 the image features 305 in the form of a multi-scale feature map $\Phi = \{\phi^s \in \mathbb{R}^{F^s \times d}, s = 1, 2, \ldots, S\}$ where S is the number of scales, and $F^s$ is the number of pixels in the feature map $\phi^s$.

The lowest-scale feature is sent into a global average pooling layer 309 followed by a three-layer MLP 310 to obtain an initial estimation of the 3D human parameter $P_0$ which is progressively refined by the transformer blocks 308 (of number B). Specifically, the refinement process can be written as:

$$T_b = f_{TB}^{(b)}(T_{b-1}, P_{b-1}, \Phi), \quad (5)$$

$$P_b = f_{linear}(T_b) + P_{b-1}, b = 1, 2, \ldots, B, \quad (6)$$

where $T_b$ and $P_b$ are respectively the target embedding and the estimated parameters from the b-th transformer block $f_{TB}^{(b)}$. Here, $f_{linear}$ is a linear layer 311 that transforms the embedding into the desired residual output. To bootstrap the refinement process, the initial target embedding $T_0$ is generated by combining $P_0$ and the image feature $\phi^S$: $T_0 = f_{GP}(\phi^S) + f_{linear}(P_0)$ where $f_{GP}$ is the global pooling function.

Figure 4:
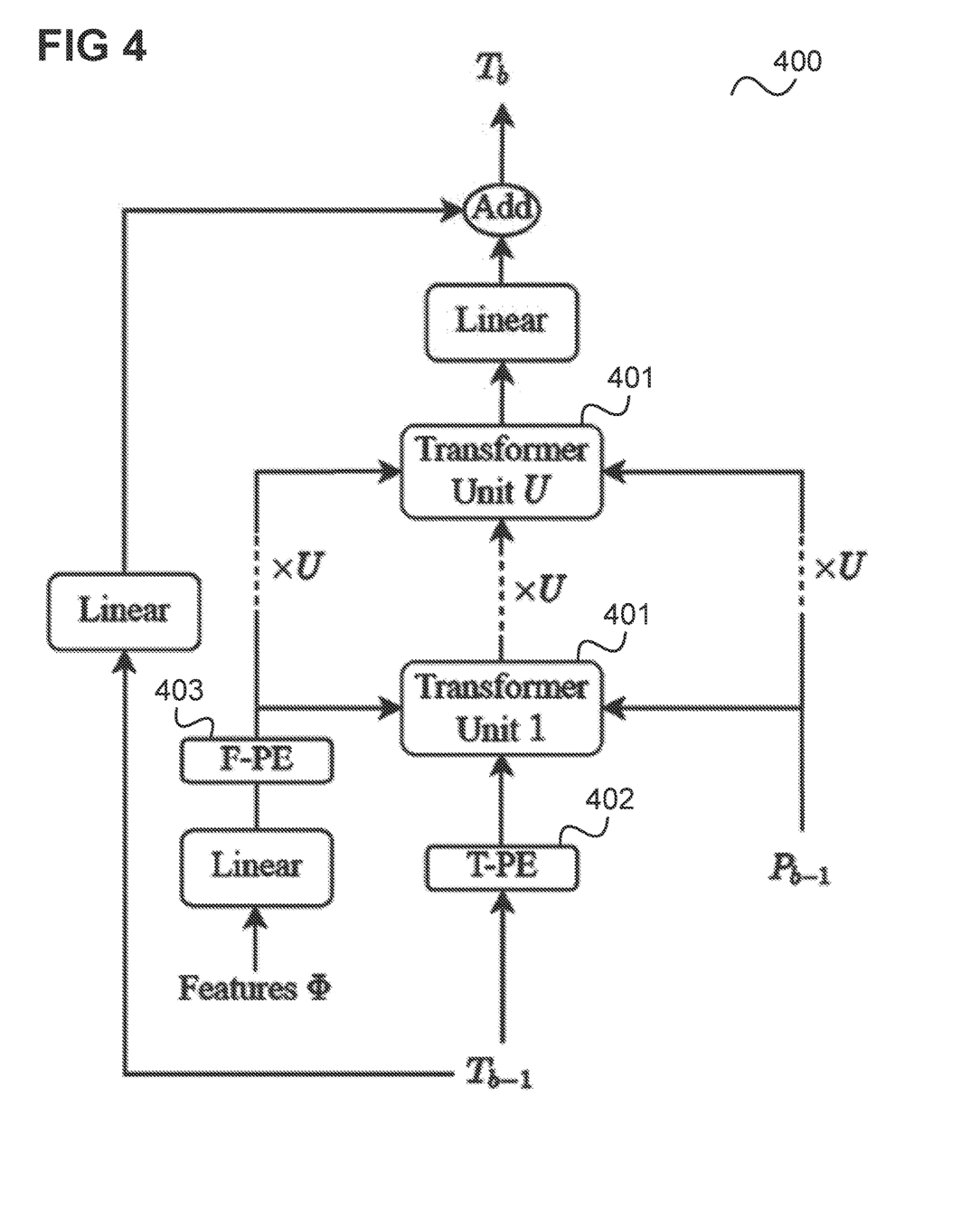
FIG. 4 shows a transformer block according to an embodiment.

FIG. 4 shows a transformer block 400 according to an embodiment (which may be used for each of the transformer blocks 308).

The transformer block mainly consists of U cascaded transformer units 401, which improve the respective target embedding T with image features $\Phi$ according to equation (4).

A way to design such a transformer unit 401 is to set each of $\mathcal{Q}$, $\mathcal{K}$, $\mathcal{V}$ in equation (4) as a concatenation of T and $\Phi$. However, as illustrated in FIG. 2A, this way models the full dependencies between target-target, target-feature, feature-target, and feature-feature, which leads to quadratic complexity with respect to the feature length, hindering the utilization of high-resolution image features for high-quality 3D human mesh recovery.

Therefore, according to various embodiments, a decoupled attention is used by combining a cross-attention layer and a self-attention layer as illustrated in FIG. 2B. The cross-attention uses T as the query and $\Phi$ as the key and value, which transfers information from the image to the target embedding. The self-attention uses T for all of $\mathcal{Q}$, $\mathcal{K}$, $\mathcal{V}$ modelling the interactions among embeddings of different body parts $q_{\theta_i}$ and body shape $q_\beta$, and camera $q_\mathcal{C}$. It should be noted that as the features $\Phi$ are extracted with a strong feature extractor 301, e.g. a deep CNN, it is less important to model feature-feature dependencies that are usually used for improving the image feature representation. This decoupling design achieves linear-complexity attention regarding to the feature length, allowing our transformer to use high-resolution features, e.g., $\phi^1$, for accurate 3D human reconstruction.

As mentioned above, according to various embodiments, the features 305 are multi-scale features. A straightforward strategy for the incorporation of multi-scale-features is to combine all-scale features of $\Phi$ into a single feature vector and then use this combined feature as $\mathcal{K}$ and $\mathcal{V}$ in equation (4). However, this strategy uses the same projection weights for different scale features and thereby models target-feature dependencies in the same subspace, which ignores the characteristics of different scales and is less flexible to fully exploit the abundant multi-scale information.

To address this issue, according to various embodiments, an Omni-scale transformer unit (OTU) is used.

Figure 5:
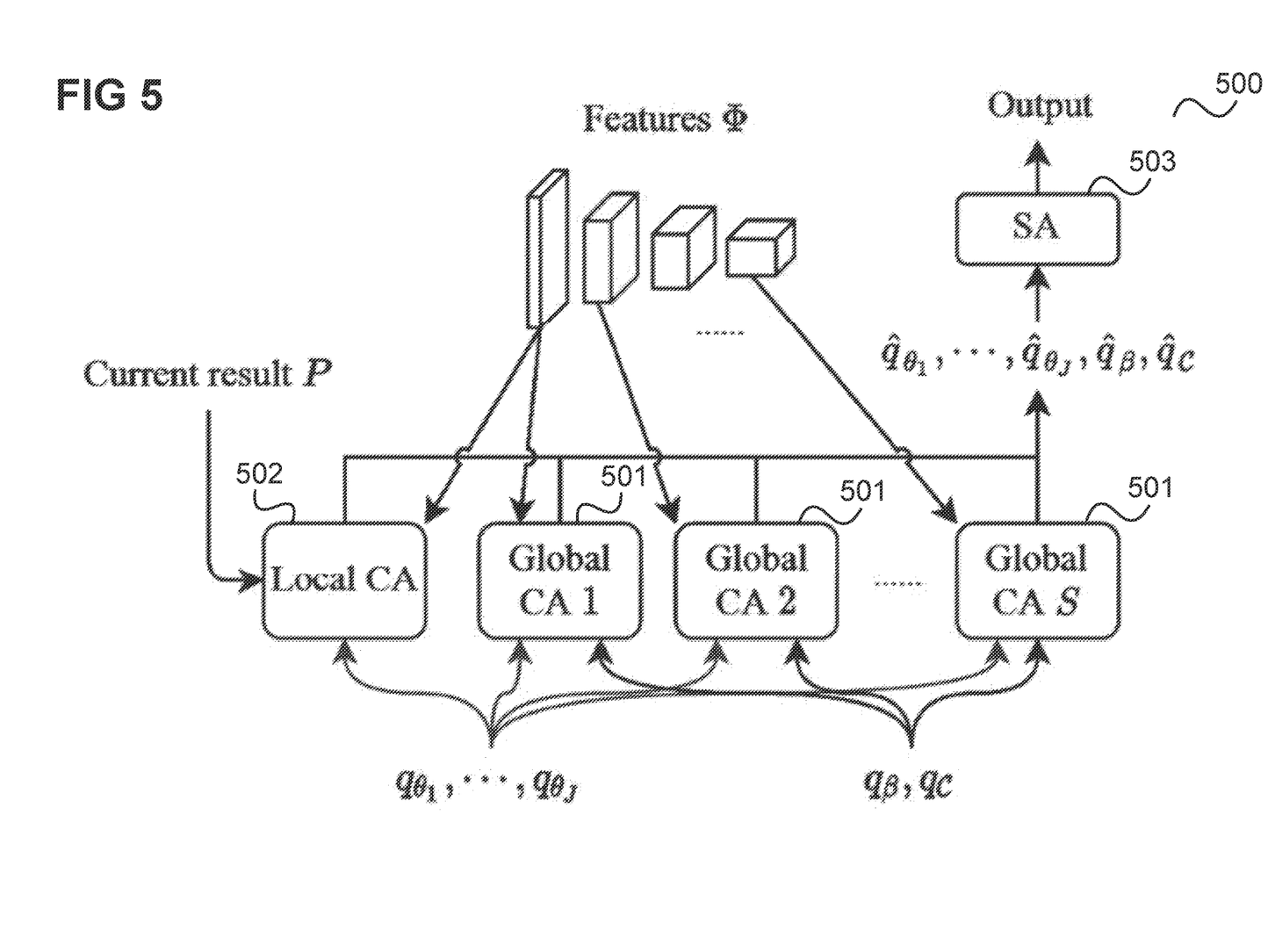
FIG. 5 shows a transformer unit according to an embodiment.

FIG. 5 shows an Omni-Scale transformer unit (OTU) 500 according to an embodiment (that may be used as the transformer units 401). Specifically, it shows the u-th transformer unit 401 of the b-th transformer block 308.

The OTU employs different projection weights for different scales by having a cross-attention layer having a cross-attention module 501 for each scale s (i.e. having a component or cross-attention (sub-)layer for each scale s; these components are also referred to as cross-attention units). Specifically, the embeddings for the body shape $\beta$ and the camera $\mathcal{C}$ can be obtained by $\hat{q}_\beta = h(q_\beta, \Phi)$ and $\hat{q}_\mathcal{C} = h(q_\mathcal{C}, \Phi)$ where h averages the attention outputs of different scales:

$$h(q, \Phi) = \frac{1}{S} \sum_{s=1}^{S} \text{Softmax}\left(\frac{(qW_q^s) \cdot (\phi^s W_k^s)^\top}{\sqrt{d}}\right)(\phi^s W_v^s). \quad (7)$$

Here, $W_q^s$, $W_k^a$, $W_v^s$ are the linear weights of the query, key, and value for scale s, respectively.

In addition, for estimating the rotation of each body part $\theta_i$, the OTU 500 includes a local attention module 502 which can be seen to be mainly based on the observation that the local articulation status around human joints strongly implies the relative rotation between neighbouring body parts and thereby it can be beneficial to adequately focus on local image features in the attention operation. Therefore, according to various embodiments, the embedding for $\theta_i$ is calculated b combining the multi-scale global attention in equation 7) and the local attention:

$$\hat{q}\theta_i = h(q\theta_i, \Phi) + \text{Softmax}\left(\frac{(q\theta_i W_q) \cdot (\phi^1_{\mathcal{N}(\mathcal{J}_i)} W_k)^\top}{\sqrt{d}} + \beta\right)(\phi^1_{\mathcal{N}(\mathcal{J}_i)} W_v), \quad (8)$$

where $\mathcal{N}(\mathcal{J}_i)$ denotes an image patch (i.e. a patch of image features) around the i-th joint $\mathcal{J}_{i_l}$ with size r×r and $\phi^1_{\mathcal{N}(\mathcal{J}_i)} \in \mathbb{R}^{r^2 \times d}$ represents the local features sampled at $\mathcal{N}(\mathcal{J}_{i_l})$ from $\phi^1$. The 2D joint $\mathcal{J}_{i_l}$ can be obtained by Eq. 3 with the current parameter estimation P. It should be noted that use the highest-resolution feature $\phi_1$ is used for the local attention here, as $\mathcal{N}(\mathcal{J}_{i_l})$ can cover a large portion of smaller feature maps such that local attention on lower-resolution features becomes similar to global attention.

Finally, the output of the 500 OTU is generated by a self-attention layer 503 (comprising at least one self-attention unit) to model the interactions among $[\hat{q}_{\theta_1}, \ldots, \hat{q}_{\theta_J}, \hat{q}_\beta, \hat{q}_C]$. It should be noted that the proposed OTU 500 realizes the design illustrated by in FIG. 2B of decoupling the full attention into cascaded cross-attention and self-attention. In the example of FIG. 5, this happens in an omni-scale manner, unifying multi-scale, global, and local image information.

As the attention operation itself in equation (4) is position agnostic, positional encoding may be used to inject the position information of the input. According to various embodiments, a learnable positional encoding is used for both the target embedding and the image feature. These are realized by a T-PE block 402 and F-PE block 403 (see FIG. 4).

In particular, the positional encoding of image features can be written as $\{\delta_s \in \mathbb{R}^{F_s \times d}, s=1, 2, \ldots, S\}$ which are directly added to D before the transformer units 401. The positional encoding may learn $\delta_s$ for all scales. However, this not only results in excessive parameters, but also ignores the relationship between the locations across different scales, e.g., similar spatial locations at different scales should have similar positional embeddings. To address this issue, according to various embodiments, the positional embedding is only learned for the highest scale, i.e., $\delta_1$, and the embeddings for the other scales are produced by average pooling of $\delta_1$: $\delta_s = f_{pool}^{(2^{s-1})}(\delta_1)$, where $f_{pool}^{(2^{s-1})}$ is the average pooling layer with a stride and window size of $2^{s-1}$.

For training the machine-learning model, the following loss function may be used:

$$\ell_{basic} = w_V \|V^B - V^{GT}\|_1 + w_X \|X^B - X^{GT}\|_2^2 + w_{\mathcal{J}} \|\mathcal{J}_i^B - \mathcal{J}_i^{GT}\|_2^2,$$

where $V^B$, $X^B$, $\mathcal{J}^B$ are the predicted vertices, 3D joints, and 2D joints that are computed with equation (3) using the final output 306, i.e. $P_B$, of the transformer 302. "GT" indicates the corresponding ground truth. $w_V$, $w_X$, $w_{\mathcal{J}}$ are hyper-parameters for balancing different terms.

While equation (9) works reasonably well for vertex regression based methods, it may be insufficient for a regression output 306 based on 3D rotations of body parts and cannot be well trained without proper rotation regularization. To address this issue, according to various embodiments, a rotation loss is further introduced:

$$\ell_{rotation} = w_R \cdot \frac{1}{J} \sum_{i=1}^{J} \|R(\theta_i^B) - R(\theta_i^{GT})\|_1, \quad (10)$$

where the predicted rotation $\theta_i^B$ from $P_B$ is encouraged to be close to the ground truth $\theta_i^{GT}$. $w_R$ is also a hyper-parameter. Since the axis-angle representation is not unique with respect to rotation, e.g., increasing the angle by $2\pi$ gives the same rotation, the axis-angle may be transformed into a rotation matrix using the Rodrigues' formula R, which computes the exponential mapping from Lie algebra $\mathfrak{so}(3)$ to Lie group SO(3) (i.e. the 3D rotation group).

So, according to various embodiments, the machine learning model is trained with a training loss comprising a combination of (e.g. a sum of) $\ell_{basic}$ and $\ell_{rotation}$. It should be noted that the CNN 301 and the transformer 302 may be trained together with this loss or the CNN 301 may be pre-trained and the transformer 302 may then be trained using this loss.

Figure 6:
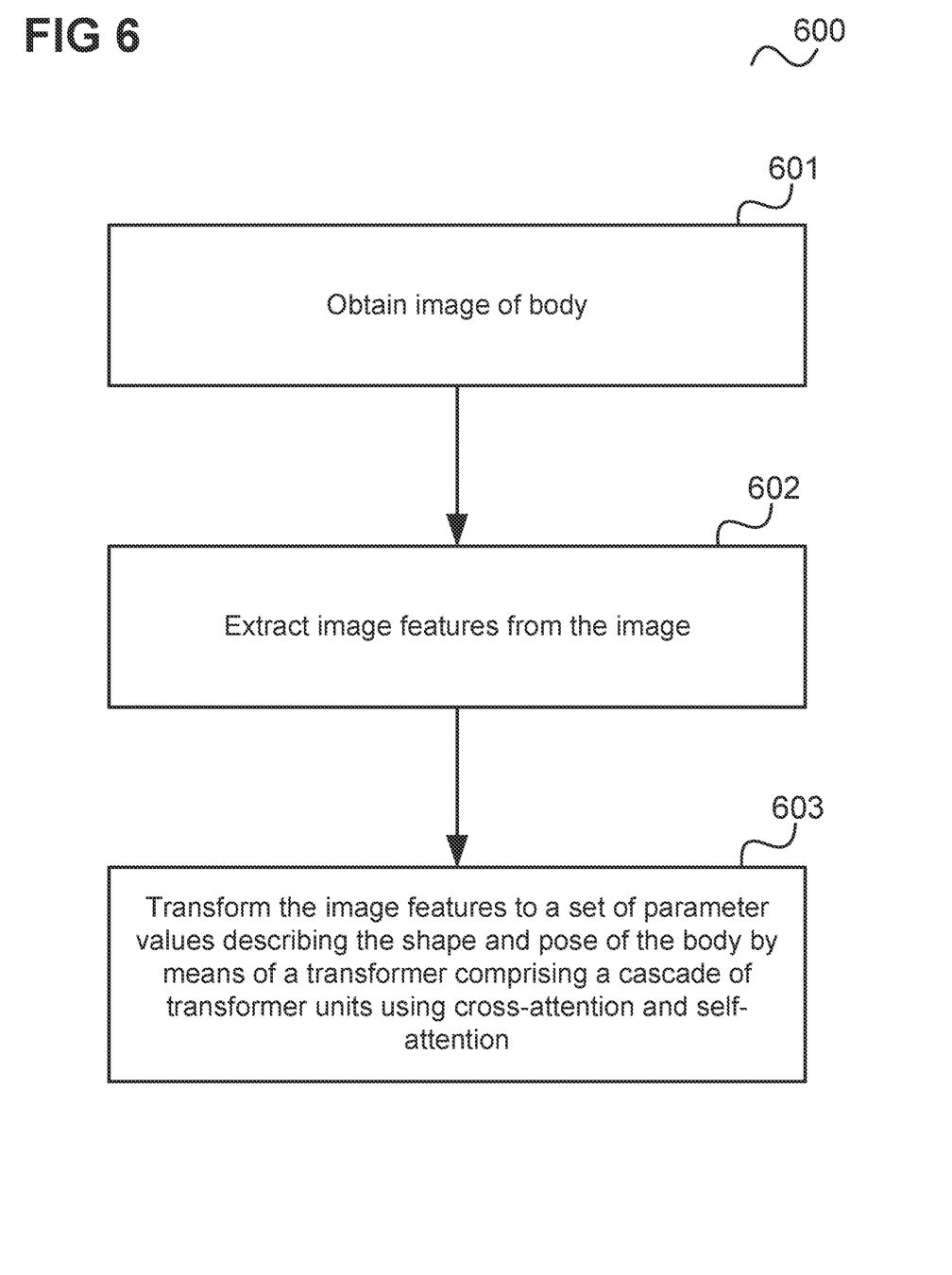
FIG. 6 shows a flow diagram illustrating a method for estimating the shape and pose of a body.

In summary, according to various embodiments, a method for estimating the shape and pose of a body is provided as illustrated in 6.

FIG. 6 shows a flow diagram 600 illustrating a method for estimating the shape and pose of a body.

In 601, an image of the body is obtained.

In 602, image features are extracted from the image.

In 603, the image features are transformed to a set of parameter values describing the shape and pose of the body by means of a transformer comprising a cascade of transformer units, wherein each transformer unit operates on a representation of a respective version of the set of parameter values and comprises a cross-attention layer modifying (e.g. replacing) the representation of the respective version of the set of parameter values by the image features weighted by an attention of the respective version of the set of parameter values to the image features in sequence with a self-attention layer modifying (e.g. replacing) the representation of the respective version of the set of parameter values by components of the representation of the respective version of the set of parameter values weighted by an attention between the components of the representation of the respective version of the set of parameter values to themselves (i.e. in particular each of the components to one or more of the other components).

According to various embodiments, in other words, shape and pose estimation is performed according to cross-attention from target representation to image features decoupled from self-attention from target representation to target representation (as illustrated by FIG. 2B and FIG. 2C) rather than a "full" attention unit which includes attention from image features to target representation and attention from image features to image features (as illustrated in FIG. 2A).

Modifying in sequence by means that one of the attention layers modifies the representation and the other attention layer further modifies the representation (depending on the order in which they are arranged in the sequence). The further modification may depend on the result of the earlier modification (i.e. the attention of the further modification is then based on the representation resulting from the earlier modification).

The estimated shape and pose may for example be used in for visual tracking, virtual/augmented reality, motion generation, image manipulation, and neural radiance fields.

The method of FIG. 6 is for example carried out by the data processing device 104 of the arrangement of FIG. 1.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor. A "circuit" may also be software being implemented or executed by a processor, e.g. any kind of computer program, e.g. a computer program using a virtual machine code. Any other kind of implementation of the respective functions which are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A method for estimating, using a neural network, the shape and pose of a body, the method comprising:
    obtaining an image of the body;
    extracting image features from the image;
    transforming the image features to a set of parameter values describing the shape and pose of the body using a transformer comprising a cascade of transformer units,
    wherein each transformer unit operates on a representation of a respective version of the set of parameter values and comprises
        a cross-attention layer modifying the representation of the respective version of the set of parameter values by the image features weighted by an attention of the respective version of the set of parameter values to the image features;
        and
        a self-attention layer modifying the representation of the respective version of the set of parameter values by components of the representation of the respective version of the set of parameter values weighted by an attention among the components of the representation of the respective version of the set of parameter values
    and processing the representation of the respective version of the set of parameter values by the cross-attention layer followed by the self-attention layer.

2. The method of claim 1, wherein the self-attention layer comprises at least one self-attention unit performing respective attention operation with query, key and value, for which each of the query, the key and the value are set to, up to a modification by positional encoding, the representation of the respective version of the set of parameter values.

3. The method of claim 1, wherein the cross-attention layer comprises at least one cross-attention unit performing respective attention operation with query, key and value, for which the query is set to, up to a modification by positional encoding, the representation of the respective version of the set of parameter values and the key and the value are set to, up to a modification by positional encoding, the image features or a subset of the image features.

4. The method of claim 1, wherein the image features comprise image features for each of a plurality of scales and wherein the cross-attention layer comprises a cross-attention unit for each layer modifying the representation of the respective version of the set of parameter values by an attention from the representation to image features of the scale.

5. The method of claim 4, wherein the cross-attention layer outputs a modified version of the representation of the set of parameter values which it generates by averaging results of the modifying performed by the cross-attention units for the scales.

6. The method of claim 1, wherein the set of parameters comprises values of parameters of a parametric body model.

7. The method of claim 6, wherein the method further comprises generating a mesh representation of the body from the values of the parameters of the parametric body model.

8. The method of claim 1, wherein the set of parameter values comprises values for a set of parameters including rotation parameters for each of a plurality of parts of the body.

9. The method of claim 8, wherein the cross-attention layer comprises a local attention unit modifying the representation of the respective version of the set of parameter values by, for each of the rotation parameters, the image features of a patch showing the body part weighted by an attention of the respective version of the set of parameter values to the image features of the patch showing the body part.

10. The method of claim 9, wherein the cross-attention layer outputs a modified version of the representation of the set of parameter values which it generates by summing a result of the modifying performed by the local attention unit and a result of the modifying of the representation of the respective version of the set of parameter values by the image features weighted by an attention of the respective version of the set of parameter values to the image features.

11. The method of claim 1, wherein the set of parameter values comprises values for a set of shape parameters.

12. The method of claim 1, wherein the image is obtained using a camera and the set of parameter values comprises values for a set of camera parameters.

13. The method of claim 1, comprising extracting the image features using a convolutional neural network.

14. The method of claim 1, comprising training the transformer by supervised learning.

15. The method of claim 14, wherein the transformer is trained using a ground truth for at least one of 2D vertices of a model of the body and joint configurations of the body.

16. The method of claim 1, wherein the cross-attention layer disregards attention of the representation of the respective version of the set of parameter values to itself and disregards attention of the respective version of the set of parameter values to the image features.

17. The method of claim 1, comprising generating an initial version of the set of parameter values from the extracted image features and generating a sequence of successively updated versions of the set of parameter values by generating each updated version of the set of parameter values by updating a previous version of the set of parameter values in the sequence according to a result of modifying a representation of the previous version of the set of parameter values by one or more of the transformer units and mapping a result of the modifying of the representation of the previous version of the set of parameter values to a corresponding version of the set of parameter values.

18. A data processing device for estimating the shape and pose of a body using a neural network, the data processing device configured to:
    obtain an image of the body;
    extract image features from the image;
    transform the image features to a set of parameter values describing the shape and pose of the body using a transformer comprising a cascade of transformer units, wherein each transformer unit operates on a representation of a respective version of the set of parameter values and comprises
    a cross-attention layer modifying the representation of the respective version of the set of parameter values by the image features weighted by an attention of the respective version of the set of parameter values to the image features; and
    a self-attention layer modifying the representation of the respective version of the set of parameter values by components of the representation of the respective version of the set of parameter values weighted by an attention among the components of the representation of the respective version of the set of parameter values and is configured to process the representation of the respective version of the set of parameter values by the cross-attention layer followed by the self-attention layer.

19. A non-transitory computer-readable medium, comprising instructions which, when executed, cause one or more processors to:
    estimate, based on a neural network, the shape and pose of a body, wherein the instructions that cause the one or more processors to estimate also cause the one or more processors to:
        obtain an image of the body;
        extract image features from the image;
        transform the image features to a set of parameter values describing the shape and pose of the body using a transformer comprising a cascade of transformer units,
    wherein each transformer unit operates on a representation of a respective version of the set of parameter values and comprises
        a cross-attention layer modifying the representation of the respective version of the set of parameter values by the image features weighted by an attention of the respective version of the set of parameter values to the image features; and
        a self-attention layer modifying the representation of the respective version of the set of parameter values by components of the representation of the respective version of the set of parameter values weighted by an attention among the components of the representation of the respective version of the set of parameter values and process the representation of the respective version of the set of parameter values by the cross-attention layer followed by the self-attention layer.

\* \* \* \* \*